(12) United States Patent
Gotou et al.

(10) Patent No.: US 10,356,867 B2
(45) Date of Patent: Jul. 16, 2019

(54) LIGHT-DIMMING DEVICE

(71) Applicant: PANASONIC INTELLECTUAL PROPERTY MANAGEMENT CO., LTD., Osaka (JP)

(72) Inventors: Kiyosi Gotou, Hyogo (JP); Eiichirou Niikura, Mie (JP); Kengo Miyamoto, Osaka (JP); Tomohiro Miyake, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/751,859

(22) PCT Filed: Sep. 1, 2016

(86) PCT No.: PCT/JP2016/003996
§ 371 (c)(1),
(2) Date: Feb. 10, 2018

(87) PCT Pub. No.: WO2017/038097
PCT Pub. Date: Mar. 9, 2017

(65) Prior Publication Data
US 2018/0235048 A1 Aug. 16, 2018

(30) Foreign Application Priority Data
Sep. 4, 2015 (JP) ................. 2015-175097

(51) Int. Cl.
*H02J 7/00* (2006.01)
*H02J 7/34* (2006.01)
(Continued)

(52) U.S. Cl.
CPC ........ *H05B 33/0848* (2013.01); *H02J 7/0068* (2013.01); *H05B 39/048* (2013.01);
(Continued)

(58) Field of Classification Search
CPC ............ H05B 33/0848; H05B 33/0815; H05B 37/0272; H02J 7/0068
See application file for complete search history.

(56) References Cited

U.S. PATENT DOCUMENTS 7,242,150 B2  7/2007  DeJonge et al.
8,593,068 B2  11/2013  Hashizume et al.
(Continued)

FOREIGN PATENT DOCUMENTS

JP  2008-97535 A  4/2008
JP  2008-225574 A  9/2008
(Continued)

OTHER PUBLICATIONS

Machine Translation of WO2014192246.*
(Continued)

*Primary Examiner* — Dedei K Hammond
*Assistant Examiner* — Raymond R Chai
(74) *Attorney, Agent, or Firm* — Renner, Otto, Boisselle & Sklar, LLP (57) ABSTRACT

In a light-dimming device according to an example of the present invention, a controller is configured to be supplied with control electric power from an electricity accumulator to operate and to retain a bidirectional switch in an on state for an on time having a length according to a dimming level in every half period of an AC voltage of an AC power supply in a lighting mode. A charger including a first charger and a second charger causes a current to flow from a pair of input terminals and to the electricity accumulator. An impedance of the second charger which is a charger in a case of causing a current to flow to the electricity accumulator in the lighting mode is lower than an impedance of the first charger which is a charger in a case of causing a current to flow to the electricity accumulator in a non-lighting mode.

10 Claims, 4 Drawing Sheets (51) Int. Cl.
*H05B 33/08* (2006.01)
*H05B 37/02* (2006.01)
*H05B 39/04* (2006.01)

(52) U.S. Cl.
CPC ............. *H02J 7/0052* (2013.01); *H02J 7/345* (2013.01); *H02J 2007/0059* (2013.01); *H05B 37/02* (2013.01); *Y02B 20/148* (2013.01)

(56) References Cited

U.S. PATENT DOCUMENTS

| | | | |
|---|---|---|---|
| 8,823,286 B2 | 9/2014 | Sasai et al. | |
| 2006/0255745 A1 | 11/2006 | DeJonge et al. | |
| 2006/0255746 A1* | 11/2006 | Kumar | H05B 39/044 315/209 R |
| 2007/0001654 A1 | 1/2007 | Newman, Jr. | |
| 2007/0236152 A1* | 10/2007 | Davis | H02M 5/293 315/209 R |
| 2011/0204807 A1* | 8/2011 | Hashizume | H01L 29/42316 315/246 |
| 2012/0230073 A1 | 9/2012 | Newman, Jr. | |
| 2013/0187563 A1 | 7/2013 | Sasai et al. | |
| 2013/0257406 A1* | 10/2013 | Hausman, Jr. | G05F 5/00 323/300 |
| 2014/0021875 A1 | 1/2014 | Jiang et al. | |
| 2014/0265896 A1* | 9/2014 | Balakrishnan | H05B 33/0815 315/200 R |
| 2017/0223812 A1* | 8/2017 | Zotter | H05B 33/0815 |

FOREIGN PATENT DOCUMENTS

| | | | |
|---|---|---|---|
| JP | 2008-541381 A | 11/2008 | |
| JP | 2011-176921 A | 9/2011 | |
| JP | 2013-149498 A | 8/2013 | |
| JP | WO 2014192246 A1 * | 12/2014 | ............ H02M 5/293 |
| WO | 2014/192246 A1 | 12/2014 | |
| WO | WO-2014192246 A1 * | 12/2014 | ............ H02M 5/293 |

OTHER PUBLICATIONS

Machine Translation of WO2014192246 (Year: 2014).*
International Search Report and Written Opinion for corresponding International Application No. PCT/JP2016/003996, dated Nov. 22, 2016.
European Office Action dated Sep. 25, 2018 for the corresponding European patent application No. 16841130.4.

* cited by examiner

LIGHT-DIMMING DEVICE

TECHNICAL FIELD

The present invention relates to a light-dimming device for dimming an illumination load.

BACKGROUND ART

A light-dimming device for dimming an illumination load is known (e.g., Patent Literature 1).

The light-dimming device described in Patent Literature 1 includes a pair of terminals, a control circuit, a control power supply configured to supply control electric power to the control circuit, and a dimming manipulation section configured to set the dimming level of the illumination load.

Between the pair of terminals, the control circuit and the control power supply are connected in parallel to each other. Moreover, between the pair of terminals, a series circuit of an alternating current (AC) power supply and an illumination load is connected. The illumination load includes a plurality of light emitting diode (LED) devices and a power supply circuit configured to light the LED devices. The power supply circuit includes a smoothing circuit of a diode and an electrolytic capacitor.

The control circuit includes a switch which enables phase control of an AC voltage to be supplied to the illumination load, a switch driver configured to drive the switch, and a controller configured to control the switch driver and the control power supply.

The control power supply is connected in parallel to the switch. The control power supply converts the AC voltage of the AC power supply into control electric power. The control power supply includes an electrolytic capacitor configured to store the control electric power.

The controller is supplied with the control electric power from the control power supply via the electrolytic capacitor. The controller includes a microcomputer. The microcomputer performs reverse phase control in accordance with a dimming level set by the dimming manipulation section to interrupt power supply to the illumination load during a time period of each of half cycles of the AC voltage.

CITATION LIST

Patent Literature

Patent Literature 1: JP 2013-149498 A

SUMMARY OF INVENTION

It is an object of the present invention to provide a light-dimming device which is compatible with an increased number of types of illumination loads.

A light-dimming device according to one aspect of the present invention includes a pair of input terminals, a bidirectional switch, an inputter, an electricity accumulator, a controller, and a charger. The pair of input terminal is electrically connected between an illumination load and an AC power supply. The bidirectional switch is configured to switch between non-conduction and conduction of a bidirectional current between the pair of input terminals. The inputter is configured to receive a signal denoting a dimming level specifying a magnitude of a light output of the illumination load. The electricity accumulator is configured to accumulate an electric charge to generate control electric power. The controller is configured to be supplied with the control electric power from the electricity accumulator to operate and to retain the bidirectional switch in an on state for an on time having a length according to the dimming level in every half period of an AC voltage of the AC power supply in a lighting mode in which the illumination load is on. The charger is configured to cause a current to flow therethrough from the pair of input terminals to the electricity accumulator. An impedance of the charger in a case of causing a current to flow to the electricity accumulator in the lighting mode is lower than an impedance of the charger in a case of causing a current to flow to the electricity accumulator in a non-lighting mode in which the illumination load is off.

DESCRIPTION OF EMBODIMENTS

The following configurations are mere examples of the present invention. The present invention is not limited to the following embodiments. Even in embodiments other than these embodiments, various modifications may be made depending on design and the like without departing from the technical idea of the present invention.

Embodiment (1.1) Configuration

Figure 1:
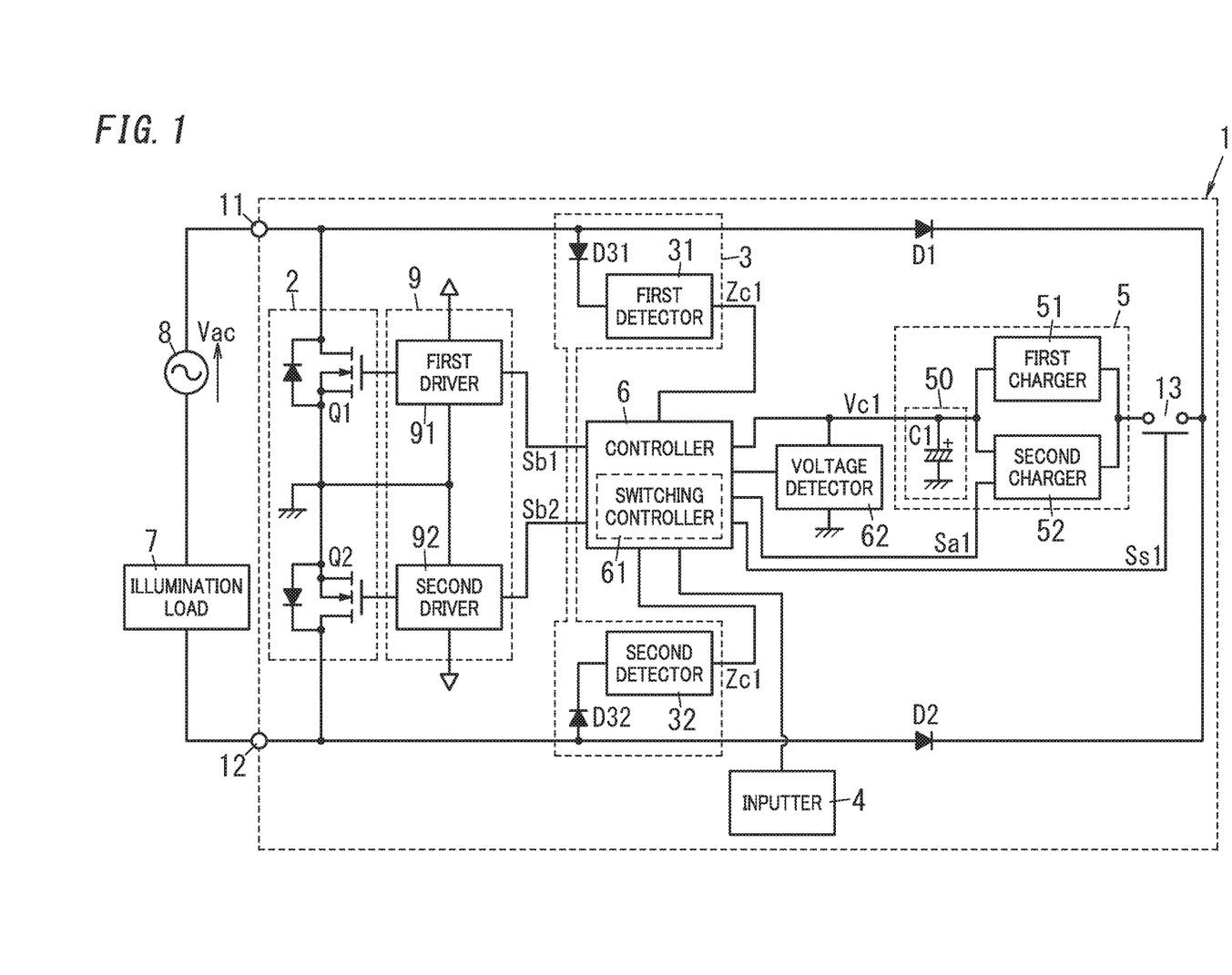
FIG. 1 is a circuit diagram of a light-dimming device according to an embodiment.
Figure 2:
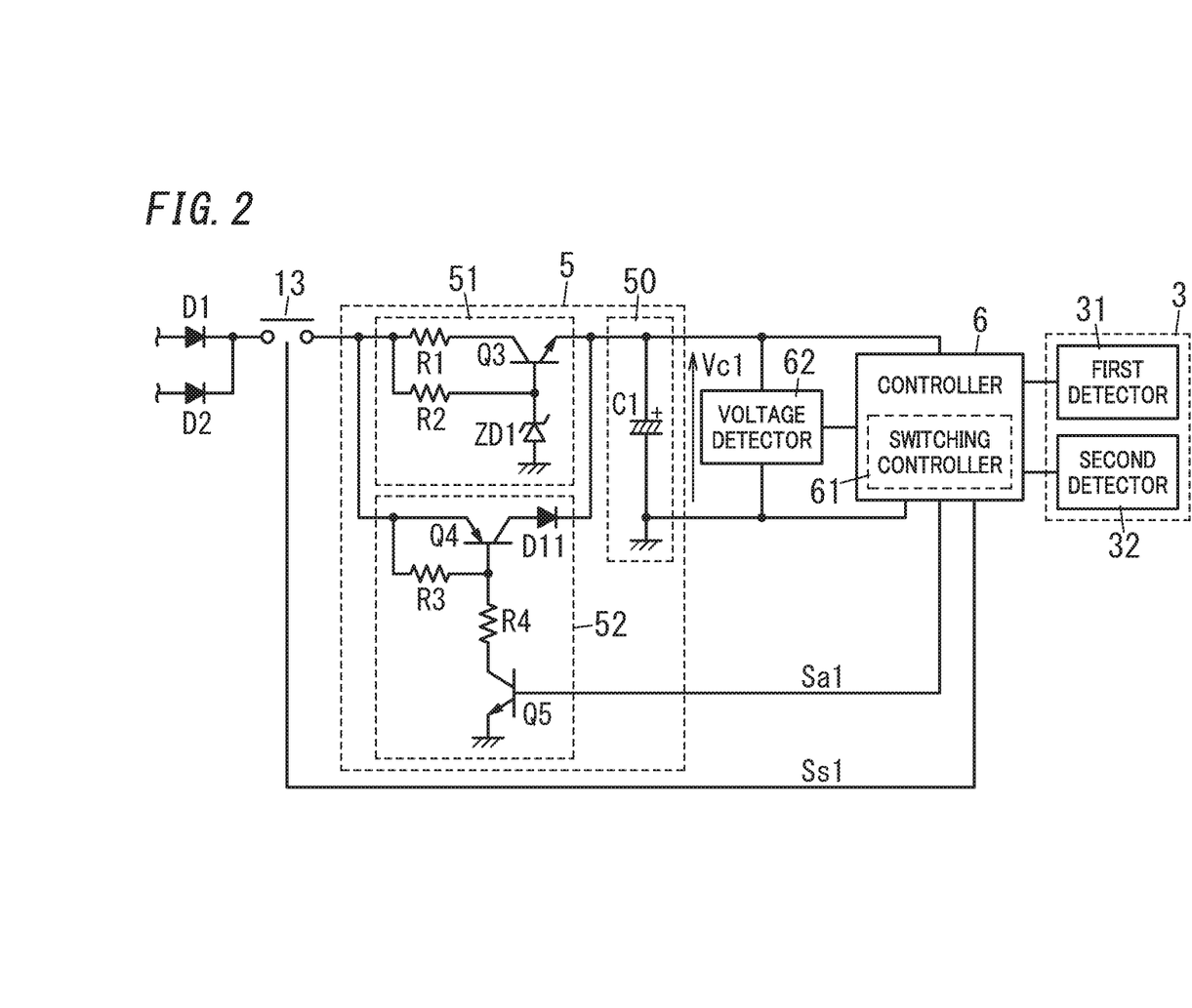
FIG. 2 is a circuit diagram of a power supply of the light-dimming device according to the embodiment.

As illustrated in FIGS. 1 and 2, a light-dimming device 1 of the present embodiment includes a pair of input terminals 11 and 12, a bidirectional switch 2, a phase detector 3, an inputter 4, a power supply 5, a controller 6, a switch driver 9, diodes D1 and D2, a stopper 13, and a voltage detector 62. The power supply 5 includes an electricity accumulator 50 and chargers (a first charger 51 and a second charger 52). The controller 6 includes a switching controller 61. The "input terminal" mentioned herein may not have an entity as a part (terminal) to which an electric wire or the like is to be connected, but the "input terminal" may be, for example, a lead of an electronic component, or a part of a conductor included in a circuit board.

The light-dimming device 1 is a two-wire light-dimming device and is used electrically connected in series to the load 7 with respect to the AC power supply 8. The load 7 is lit when supplied with electric power. The load 7 includes an LED device as a light source and a lighting circuit configured to light the LED device. The AC power supply 8 is, for example, a commercial power supply having a single phase 100 V and 60 Hz. The light-dimming device 1 is applicable to, for example, a wall switch.

The bidirectional switch 2 includes, for example, two devices, namely a first switching device Q1 and a second switching device Q2 electrically connected in series between the input terminals 11 and 12. For example, each of the switching devices Q1 and Q2 is a semiconductor switching device including an enhancement n-channel metal-oxide-semiconductor field effect transistor (MOSFET).

The switching devices Q1 and Q2 are connected in a so-called anti-series connection between the input terminals 11 and 12. That is, the sources of the switching devices Q1 and Q2 are connected to each other. The drain of the switching device Q1 is connected to the input terminal 11, and the drain of the switching device Q2 is connected to the input terminal 12. The sources of both of the switching devices Q1 and Q2 are connected to ground of the power supply 5. The ground of the power supply 5 corresponds to a reference potential for an internal circuit of the light-dimming device 1.

The bidirectional switch 2 is capable of switching among four states by a combination of on and off of the switching devices Q1 and Q2. The four states include a bidirectionally off state where both the switching devices Q1 and Q2 are off, a bidirectionally on state where both the switching devices Q1 and Q2 are on, and two kinds of unidirectionally on states: a case where only the switching device Q1 is on and a case where only the switching device Q2 is on. In a unidirectionally on state, unidirectional conduction is established between the pair of input terminals 11 and 12, from one of the switching devices Q1 and Q2 which is on, through a parasitic diode of the other of the switching devices Q1 and Q2 which is off. For example, when the switching device Q1 is on and the switching device Q2 is off, a first unidirectionally on state where a current flows from the input terminal 11 toward the input terminal 12 is achieved. Alternatively, when the switching device Q2 is on and the switching device Q1 is off, a second unidirectionally on state where a current flows from the input terminal 12 toward the input terminal 11 is achieved. Thus, when an AC voltage Vac is applied from the AC power supply 8 between the input terminals 11 and 12, in a positive polarity of the AC voltage Vac, that is, in a half period in which the input terminal 11 has a high potential, the first unidirectionally on state is a forward on state, and the second unidirectionally on state is a reverse on state. On the other hand, in a negative polarity of the AC voltage Vac, that is, in a half period in which the input terminal 12 has the high potential, the second unidirectionally on state is the forward on state, and the first unidirectionally on state is the reverse on state.

Here, the bidirectional switch 2 is in an on state in both the bidirectionally on state and the forward on state, and is in an off state in both the bidirectionally off state and the reverse on state.

The phase detector 3 detects the phase of the AC voltage Vac applied between the input terminals 11 and 12. The "phase" mentioned herein includes a zero crossing point of the AC voltage Vac and the polarity (positive polarity, negative polarity) of the AC voltage Vac. The phase detector 3 is configured to output a detection signal to the controller 6 when the phase detector 3 detects the zero crossing point of the AC voltage Vac. The phase detector 3 includes a diode D31, a first detector 31, a diode D32, and a second detector 32. The first detector 31 is electrically connected to the input terminal 11 via the diode D31. The second detector 32 is electrically connected to the input terminal 12 via the diode D32. The first detector 31 detects a zero crossing point when the AC voltage Vac transitions from a negative half period to a positive half period. The second detector 32 detects a zero crossing point when the AC voltage Vac transitions from the positive half period to the negative half period.

That is, the first detector 31 determines the zero crossing point when detecting a transition from a state where a voltage with the input terminal 11 having a high electric potential is lower than a specified value to a state where the voltage with the input terminal 11 having the high electric potential is higher than or equal to the specified value. The first detector 31 outputs a first detection signal ZC1 to the controller 6 when detecting the transition. Similarly, the second detector 32 determines the zero crossing point when detecting a transition from a state where a voltage with the input terminal 12 having a high electric potential is lower than a specified value to a state where the voltage with the input terminal 12 having a high electric potential is higher than or equal to the specified value. The second detector 32 outputs a second detection signal ZC2 to the controller 6 when detecting the transition. The specified value is a value (an absolute value) set close to 0 V. For example, the specified value of the first detector 31 is a value about several volts, and the specified value of the second detector 32 is a value about several volts. Thus, detection points at which the zero crossing points are detected by the first detector 31 and the second detector 32 are a little later than the zero crossing points (0 V) in a strict sense.

The inputter 4 receives a signal denoting the dimming level from a manipulation section manipulated by a user and outputs the signal as a dimming signal to the controller 6. The inputter 4 may process the received signal or does not have to process the received signal to output the dimming signal. The dimming signal corresponds to a numerical value or the like specifying the magnitude of the light output of the load 7 and may include an off level at which the load 7 is in a non-lighting state. The manipulation section is only required to be configured to be manipulated by a user to output a signal denoting the dimming level to the inputter 4. The manipulation section may be, for example, a variable resistor, a rotary switch, a touch panel, a remote controller, or a communication terminal such as a smartphone.

The controller 6 controls the bidirectional switch 2 on the basis of the detection signals from the phase detector 3 and the dimming signal from the inputter 4. The controller 6 individually controls the switching devices Q1 and Q2. Specifically, the controller 6 controls the switching device Q1 by a first control signal Sb1 and controls the switching device Q2 by a second control signal Sb2. Moreover, the switching controller 61 of the controller 6 outputs a switching signal Sa1 to the second charger 52. The switching signal Sa1 switches between non-conduction and conduction of a current flowing to the electricity accumulator 50 via the second charger 52.

The controller 6 includes, for example, a microcomputer as a main configuration. The microcomputer executes a program stored in memory of the microcomputer by a central processing unit (CPU) to realize a function as the controller 6. The program may be stored in the memory of the microcomputer in advance, may be provided as a recording medium such as a memory card storing the program, or may be provided via an electronic communication network. In other words, the program is a program which causes a computer (in this embodiment the microcomputer) to function as the controller 6.

The switch driver 9 includes a first driver 91 configured to drive (perform on/off control of) the switching device Q1 and a second driver 92 configured to drive (perform on/off control of) the switching device Q2. The first driver 91 receives the first control signal Sb1 from the controller 6 to apply a gate voltage to the switching device Q1. In this way, the first driver 91 performs the on/off control of the switching device Q1. Similarly, the second driver 92 receives the second control signal Sb2 from the controller 6 to apply a gate voltage to the switching device Q2. In this way, the second driver 92 performs the on/off control of the switching device Q2. The first driver 91 generates the gate voltage with reference to the potential of the source of the switching device Q1. The same applies to the second driver 92.

When receiving a stop signal Ss1 from the controller 6, the stopper 13 halts charging of the electricity accumulator 50. When in a lighting mode, a voltage Vc1 detected by the voltage detector 62 reaches a prescribed threshold Vth1 in a state where the second charger 52 causes a current to flow therethrough to the electricity accumulator 50, the controller 6 causes the stopper 13 to halt the charging of the electricity accumulator 50. In the present embodiment, the stopper 13 electrically interrupts the power supply 5 or controls a semiconductor switching device included in the power supply 5, thereby halting the charging of the electricity accumulator 50. Note that the power supply 5 continues generating control electric power by electric charges charged in the electricity accumulator 50 while the stop signal Ss1 is not input from the controller 6. In the example shown in FIG. 1, the stopper 13 and the power supply 5 form a series circuit. The series circuit of the stopper 13 and the power supply 5 is electrically connected in parallel to the bidirectional switch 2 between the input terminals 11 and 12. Specifically, the stopper 13 is a switch electrically connected between the power supply 5 and a connection point between the pair of diodes D1 and D2. When receiving the stop signal Ss1 from the controller 6, the stopper 13 is turned off, thereby electrically disconnecting the power supply 5 from the input terminals 11 and 12. The "lighting mode" mentioned herein is a mode in which the load 7 is lit. In the lighting mode, the controller 6 retains the bidirectional switch 2 in the on state for an on time having a length according to the dimming level in every half period of the AC voltage Vac. Moreover, the "non-lighting mode" is a mode in which the load 7 is not lit. In the non-lighting mode, the bidirectional switch 2 is continuously in the off state. That is, in the non-lighting mode, the controller 6 retains the bidirectional switch 2 continuously in the off state.

The power supply 5 includes the electricity accumulator 50, the first charger 51, and the second charger 52. The power supply 5 is electrically connected to the input terminal 11 via the diode D1 and is electrically connected to the input terminal 12 via the diode D2. Moreover, the ground of the power supply 5 is electrically connected to a connection point of respective parasitic diodes of the switching devices Q1 and Q2. Thus, a diode bridge including the diodes D1 and D2 and parasitic diodes of the switching devices Q1 and Q2 performs full-wave rectification of the AC voltage Vac applied between the input terminals 11 and 12, and the full-wave rectified AC voltage Vac is then supplied to the power supply 5. Thus, when the bidirectional switch 2 is in the off state, the full-wave rectified AC voltage Vac (a pulsating voltage output from the diode bridge) is to be applied to the power supply 5.

The electricity accumulator 50 includes a capacitive element (a capacitor C1). The electricity accumulator 50 serves as a power supply of the controller 6 and the switch driver 9. A voltage across the capacitive element C1 is, for example, a constant voltage higher than or equal to 3 V. However, a voltage obtained by stepping up the voltage across the capacitive element C1 may be applied to the switch driver 9.

As illustrated in FIG. 2, the first charger 51 is a series regulator circuit including resistors R1 and R2, a switching device Q3, and a Zener diode ZD1. The resistor R1 and the switching device Q3 are connected in series to each other between the stopper 13 and the capacitive element C1 (the electricity accumulator 50). The switching device Q3 is, for example, an npn-bipolar transistor. The switching device Q3 has a collector connected to the resistor R1, and the switching device Q3 has an emitter connected to the capacitive element C1. The resistor R2 is connected between the stopper 13 and the base of the switching device Q3. The Zener diode ZD1 has a cathode connected to the base of the switching device Q3. The Zener diode ZD1 has an anode connected to the ground of the power supply 5. When the pulsating voltage (a voltage obtained by full-wave rectification of the AC voltage Vac) is input to the first charger 51 via the diodes D1 and D2, the first charger 51 converts the input voltage into a constant direct-current voltage, and a charging current flows through the capacitive element C1 via the resistor R1 serving as an impedance element. Note that in the non-lighting mode, the input voltage has a maximum value of about 140 V, and the resistance value of the resistor R1 is set to several hundreds kΩ so that an input current is several mA.

The second charger 52 is a circuit which causes a current to flow therethrough from the input terminals 11 and 12 to the capacitor C1 (the electricity accumulator 50) in the lighting mode of the load 7. The first charger 51 causes a current to flow therethrough from the input terminals 11 and 12 to the capacitive element C1 also in the lighting mode. The second charger 52 includes switching devices Q4 and Q5, resistors R3 and R4, and a diode D11. The switching device Q4 and the diode D11 are connected in series to each other between the stopper 13 and the capacitive element C1. The switching device Q4 is, for example, a pnp-bipolar transistor. The switching device Q4 has an emitter connected to the stopper 13. The switching device Q4 has a collector connected to the capacitive element C1 via the diode D11. The resistor R3 is connected between the base and the emitter of the switching device Q4. The base of the switching device Q4 is connected to the ground of the power supply 5 via the resistor R4 and the switching device Q5. The switching device Q5 is, for example, an npn-bipolar transistor. The switching device Q5 has a collector connected to the resistor R4. The switching device Q5 has an emitter connected to the ground of the power supply 5. The switching device Q5 has a base connected to the controller 6. The switching signal Sa1 is input to the base of the switching device Q5 from the controller 6 (the switching controller 61). If the switching signal Sa1 is an ON signal, the switching device Q5 is turned on, and the switching device Q4 is turned on, so that a current flows via the second charger 52. If the switching signal Sa1 is an OFF signal, the switching device Q5 is turned off, and the switching device Q4 is turned off, so that no current flows via the second charger 52. In the second charger 52, the charging current flows to the capacitive element C1 via the switching device Q4 and the diode D11, and therefore, an impedance seen from the input terminals 11 and 12 in the second charger 52 is lower than that in the first charger 51.

The circuit configurations of the first charger 51 and the second charger 52 are not limited to the above-described circuit configurations. The circuit configurations of the first charger 51 and the second charger 52 may be accordingly modified as long as the circuit configurations result in the impedance seen from the input terminals 11 and 12 in the second charger 52 is lower than that in the first charger 51. That is, the chargers (the first charger 51 and the second charger 52) of the electricity accumulator 50 are configured such that the impedance seen from the input terminals 11 and 12 in the lighting mode is lower than that in the non-lighting mode.

Moreover, in the present embodiment, the voltage detector 62 detects the voltage Vc1 across the capacitive element C1 and outputs a detection value of the voltage Vc1 to the controller 6 (see FIG. 2). The voltage detector 62 may detect the value of the voltage Vc1 as it is or may detect a voltage obtained by dividing the voltage Vc1 by a voltage-dividing resistor.

The controller 6 compares the detection value (the voltage Vc1 of the capacitive element C1) of a voltage detector 53 with the prescribed threshold Vth1 (see FIG. 3) in an off-time period from a switching time point (a time point at which the bidirectional switch 2 is switched from the on state to the off state) to an end time point of the half period of the AC voltage Vac. When the detection value (the voltage Vc1) reaches the threshold Vth1, the stop signal Ss1 is switched from the ON signal to the OFF signal. In this embodiment, the threshold Vth1 is a voltage across the capacitive element C1 when the capacitive element C1 is charged to such an extent that operation of the controller 6 can be secured at least until the next switching time point. Specifically, a value obtained by adding a prescribed margin to a minimum value Vmin is used as the threshold Vth1 so that the voltage Vc1 of the capacitive element C1 does not decrease below the minimum value Vmin (see FIG. 3) in any dimming level. The "minimum value Vmin" mentioned herein is a minimum value of the voltage Vc1 required for controller 6 to normally operate.

The stopper 13 stops an operation of generating control electric power by the electricity accumulator 50 while the stop signal Ss1 input from the controller 6 is the OFF signal (e.g., at a low level). In the present embodiment, the stopper 13 electrically interrupts the power supply 5 or controls a semiconductor switching device included in the power supply 5, thereby halting the charging of the electricity accumulator 50. In the example of FIG. 1, the stopper 13 and the power supply 5 form a series circuit. The series circuit of the stopper 13 and the power supply 5 is electrically connected in parallel to the bidirectional switch 2 via the diode bridge between the pair of input terminals 11 and 12.

Specifically, the stopper 13 is a switch electrically connected between the power supply 5 and a connection point between the pair of diodes D1 and D2. When receiving the stop signal Ss1 from the controller 6, the stopper 13 is turned on/off. The stopper 13 is turned on when the stop signal Ss1 is the ON signal (e.g., at a high level) to electrically connect the power supply 5 to the input terminals 11 and 12. On the other hand, when the stop signal Ss1 is the OFF signal, the stopper 13 is turned off, thereby electrically disconnecting the power supply 5 from the input terminals 11 and 12.

The lighting circuit of the load 7 reads a dimming level from the waveform of the AC voltage Vac phase-controlled by the light-dimming device 1 to vary the magnitude of the light output of the LED device. Here, the lighting circuit includes, for example, a circuit for securing a current such as a bleeder circuit. Thus, also during a time period during which the bidirectional switch 2 of the light-dimming device 1 is non-conductive, a current is allowed to pass through the load 7.

(1.2) Operation (1.2.1) Activation Operation

First, activation operation when conduction of the light-dimming device 1 of the present embodiment is started will be described.

In the light-dimming device 1 having the above-described configuration, when the AC power supply 8 is connected between the input terminals 11 and 12 via the load 7, the AC voltage Vac applied between the input terminal 11 and 12 from the AC power supply 8 is rectified, and then the AC voltage Vac is supplied to the power supply 5. At this time, the capacitive element C1 is charged via the first charger 51, and when the voltage across the capacitive element C1 exceeds the minimum value Vmin, the controller 6 is activated.

When the controller 6 is activated, the controller 6 determines the frequency of the AC power supply 8 on the basis of a detection signal of the phase detector 3. Then, on the basis of the frequency determined by the controller 6, the controller 6 refers to a numerical value table stored in memory in advance to set various types of parameters such as a time. Here, if the dimming level input to the inputter 4 is the off level, the controller 6 maintains the bidirectional switch 2 in the bidirectionally off state to keep the impedance between the pair of input terminals 11 and 12 in a high impedance state. Thus, the load 7 keeps a non-lighting state.

(1.2.2) Dimming Operation

Figure 3:
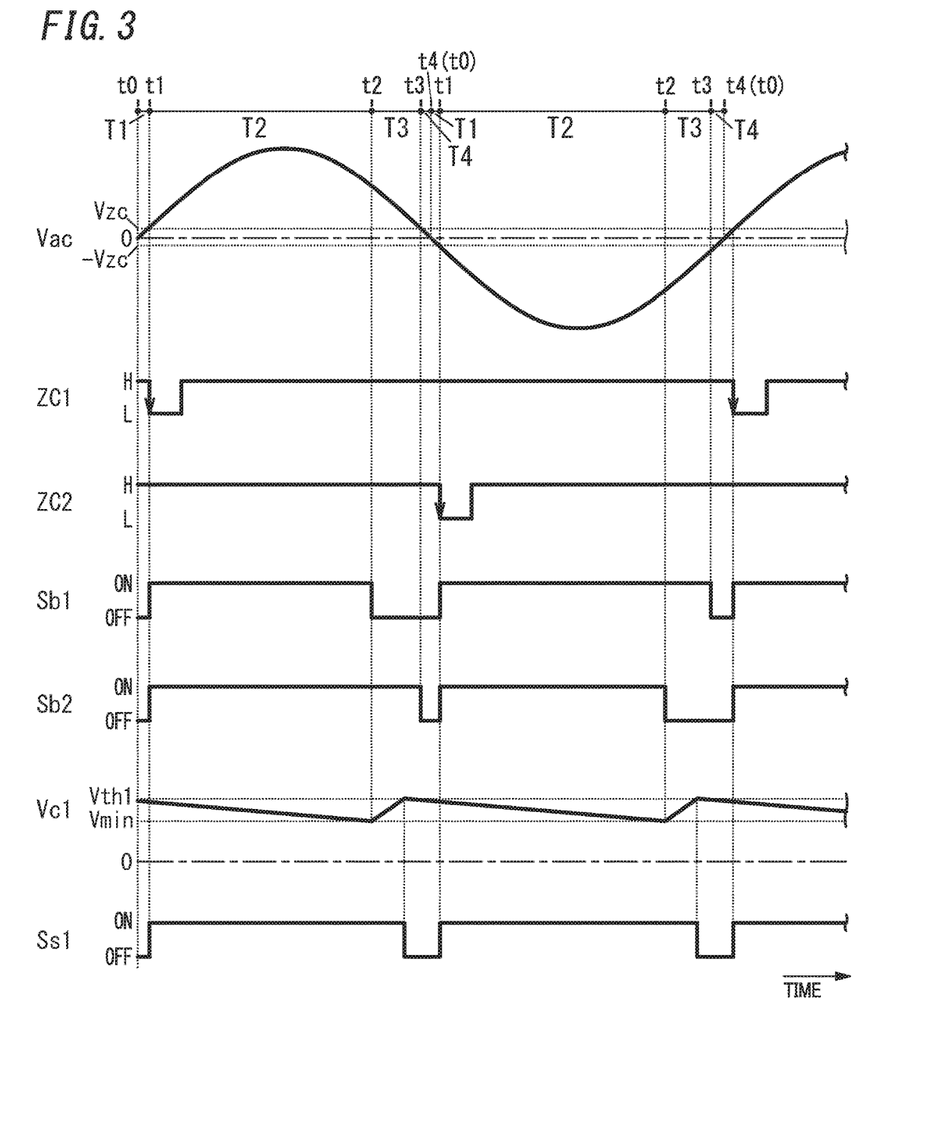
FIG. 3 is a timing chart illustrating operation of the light-dimming device according to the embodiment.

Next, dimming operation of the light-dimming device 1 of the present embodiment will be described with reference to FIG. 3. FIG. 3 shows the AC voltage Vac, the first detection signal ZC1, the second detection signal ZC2, the first control signal Sb1, the second control signal Sb2, the voltage Vc1 of the capacitive element C1, and the stop signal Ss1.

In the present embodiment, transition of the first detection signal ZC1 from a high level to a low level means generation of the first detection signal ZC1. Moreover, transition of the second detection signal ZC2 from the high level to the low level means generation of the second detection signal ZC2. That is, the first detection signal ZC1 and the second detection signal ZC2 are signals which transition from the high level to the low level when the zero crossing point is detected. The voltage Vc1 of the capacitive element C1 and the stop signal Ss1 will be described in "(1.2.3) Generation Operation of Control Electric Power". In the following description, the expression "from a time point A" includes the time point A. For example, "from a first time point" includes the first time point. On the other hand, the expression "to a time point A" excludes the time point A and means "until immediately before the time point A". For example, "to an end time point of a half period" excludes the end time point of the half period and means "until immediately before the end time point of the half period".

First, the operation of the light-dimming device 1 during a positive half period of the AC voltage Vac is described. The light-dimming device 1 detects the zero crossing point of the AC voltage Vac by the phase detector 3. The zero crossing point serves as a reference for phase control. The first detector 31 outputs the first detection signal ZC1 when the AC voltage Vac reaches a positive specified value Vzc in the course of a transition of the AC voltage Vac from a negative half period to the positive half period. In the present embodiment, a generation time point of the first detection signal ZC1 is defined as a first time point t1, and a time period from a starting point (zero crossing point) t0 to the first time point t1 of the positive half period is defined as a first time period T1. During the first time period T1 from the starting point t0 to a first time point t1 of the half period, the controller 6 retains the first control signal Sb1 and the second control signal Sb2 as OFF signals. Thus, during the first time period T1, both the switching devices Q1 and Q2 are off, and the bidirectional switch 2 is in the bidirectionally off state. At the first time point t1, the controller 6 sets the first control signal Sb1 and the second control signal Sb2 to ON signals.

A second time point t2 is a time point when the on time having a length according to the dimming signal elapses from the first time point t1. At the second time point t2, the controller 6 keeps the second control signal Sb2 set to the ON signal and sets the first control signal Sb1 to an OFF signal. In this way, during a second time period T2 from the first time point t1 to the second time point t2, both the switching devices Q1 and Q2 are on, and the bidirectional switch 2 is in the bidirectionally on state. Thus, during the second time period T2, electric power is supplied from the AC power supply 8 via the bidirectional switch 2 to the load 7, and the load 7 therefore emits light.

A third time point t3 is a time point earlier than an end time point (a zero crossing point) t4 of the half period by a definite time (e.g., 300 μs). That is, when it is assumed that the end time point t4 is a time point at which a time obtained by subtracting the first time period T1 from a time corresponding to the half period has elapsed since the first time point t1 serving as the generation time point of the first detection signal ZC1, the third time point t3 is a time point earlier than the end time point t4 by a definite time period. Note that in the timing chart of FIG. 3, the third time point t3 is illustrated to coincide with a timing at which the AC voltage Vac reaches a positive specified value Vzc or a timing at which the AC voltage Vac reaches a negative specified value −Vzc, but the third time point t3 is determined regardless of the timing at which the AC voltage Vac reaches the positive specified value Vzc or the negative specified value −Vzc.

At the third time point t3, the controller 6 sets the first control signal Sb1 and the second control signal Sb2 to OFF signals. In this way, during a third time period T3 from the second time point t2 to the third time point t3, only the switching device Q1 of the switching devices Q1 and Q2 is off, and the bidirectional switch 2 is in a reverse on state. Thus, during the third time period T3, supplying of electric power from the AC power supply 8 to the load 7 is interrupted.

During a fourth time period T4 from the third time point t3 to the end time point (zero crossing point) t4 of the half period, both the switching devices Q1 and Q2 are off, and the bidirectional switch 2 is in the bidirectionally off state.

Moreover, the operation of the light-dimming device 1 during the negative half period of the AC voltage Vac is substantially the same as that during the positive half period.

In the negative half period, when the AC voltage Vac reaches the negative specified value −Vzc, the second detector 32 outputs the second detection signal ZC2. In the present embodiment, a first time period T1 is a time period from a starting point t0 (t4) of the negative half period to a first time point t1 which is a generation time point of the second detection signal ZC2. Moreover, the second time point t2 is a time point when the on time having a length according to the dimming signal elapses from the first time point t1. The third time point t3 is a time earlier than the end time point t4 (t0) of the half period by a definite time period (e.g., 300 μs).

During the first time period T1, the controller 6 controls such that the first control signal Sb1 and the second control signal Sb2 are OFF signals. Thus, the bidirectional switch 2 is in the bidirectionally off state during the first time period T1. Then, at the first time point t1, the controller 6 sets the first control signal Sb1 and second control signal Sb2 to the ON signals. In this way, during a second time period T2 from the first time point t1 to the second time point t2, both the switching devices Q1 and Q2 are on, and the bidirectional switch 2 is in the bidirectionally on state. Thus, during the second time period T2, electric power is supplied from the AC power supply 8 via the bidirectional switch 2 to the load 7, and the load 7 therefore emits light.

At the second time point t2, the controller 6 keeps the first control signal Sb1 set to the ON signal and sets the second control signal Sb2 to an OFF signal. At the third time point t3, the controller 6 sets the first control signal Sb1 and the second control signal Sb2 to OFF signals. In this way, during a third time period T3 from the second time point t2 to a third time point t3, only the switching device Q2 of the switching devices Q1 and Q2 is off, and the bidirectional switch 2 is in the reverse on state. Thus, during the third time period T3, supplying of electric power from the AC power supply 8 to the load 7 is interrupted. During the fourth time period T4 from the third time point t3 to the end time point t4 of the half period, both the switching devices Q1 and Q2 are OFF, and the bidirectional switch 2 is in the bidirectionally off state.

The light-dimming device 1 of the present embodiment alternately repeats the operation during the positive half period and the operation during the negative half period in every half period of the AC voltage Vac which are described above to dim the load 7.

In the present embodiment, since the bidirectionally on state is the on state, and the reverse on state is the off state, a time point at which the bidirectional switch 2 is switched from the bidirectionally on state to the reverse on state, that is, the second time point t2 corresponds to the switching time point. Since the time (the on time) from the first time point t1 to the switching time point (the second time point t2) is a time according to the dimming level input to the inputter 4, a time when the input terminals 11 and 12 are conductive during the half period is to be determined in accordance with the dimming level. Moreover, when the positive specified value Vzc and the negative specified value −Vzc are fixed values, a time from the starting point t0 to the first time point (the generation time point of the first detection signal ZC1 or the second detection signal ZC2) t1 of the half period has a substantially fixed length.

Thus, a variable time, which is defined as a time from the starting point t0 to the switching time point (the second time point t2) of the half period, that is, a sum of the first time period T1 and the on time (the second time period T2) having a length which is variable according to the dimming level, has a length that varies in accordance with the dimming level. In other words, the variable time is a time having a variable length, and the phase of the AC voltage Vac at the switching time point (the second time point t2) varies in accordance with the dimming level. That is, in order to achieve a small light output of the load 7, the variable time is set short, whereas in order to achieve a large light output of the load 7, the variable time is set long. Thus, it is possible to vary the magnitude of the light output of the load 7 in accordance with the dimming level input to the inputter 4.

Moreover, during the latter part of the half period of the AC voltage Vac, specifically, during the time periods (the third time period T3 and the fourth time period T4) from the switching time point (the second time point t2) to the end time point t4 of the half period, the bidirectional switch 2 is in the off state (in the reverse on state or in the bidirectionally off state). In the present embodiment, a time period which is a sum of the third time period T3 and the fourth time period T4 corresponds to the off-time period. The light-dimming device 1 can secure supplying electric power from the AC power supply 8 to the power supply 5 during the off-time period. Operation of the power supply 5 will be described in detail in "(1.2.3) Generation Operation of Control Electric Power". Moreover, the bidirectional switch 2 is in the off state also during a time period from the starting point (zero crossing point) t0 to the first time point t1 of the half period. Thus, when attention is focused on two consecutive half periods, the bidirectional switch 2 is in the off state from the second time point t2 of the first half period to the first time point t1 of the next half period (i.e., the second half period).

In this embodiment, the expression "from a time point A" includes the time point A. For example, "from a first time point" includes the first time point. On the other hand, the expression "to a time point A" excludes the time point A and means "until immediately before the time point A". For example, "to an end time point of a half period" excludes the end time point of the half period and means "until immediately before the end time point of the half period".

In the present embodiment, since the off-time period is determined with priority given to securement of supplying electric power from the AC power supply 8 to the power supply 5, there may be a case where the second time period T2 for supplying electric power to the load 7 is not determined in accordance with the dimming level input to the inputter 4. For example, even when a user manipulates the manipulation section to obtain a maximum light output of the load 7, priority is given to the setting of the off-time period (the third time period T3 and the fourth time period T4), and the second time period T2 may not be determined as the dimming signal from the inputter.

(1.2.3) Generation Operation of Control Electric Power

The switching controller 61 of the controller 6 selects, as a charger which causes a charging current to flow to the electricity accumulator 50, the first charger 51 in the non-lighting mode and the second charger 52 in the lighting mode in addition to the first charger 51.

In the non-lighting mode, the switching controller 61 switches the switching signal Sa1 to the OFF signal. When the switching signal Sa1 becomes the OFF signal, the switching devices Q5 and Q4 are both turned off and the charging current does not flow from the second charger 52 to the capacitive element C1, thereby achieving a state where the charging current flows to the capacitive element C1 via the first charger 51. That is, in the non-lighting mode, the charger which causes the charging current to flow to the electricity accumulator 50 is the first charger 51. Since the diode D11 is connected between the switching device Q4 and the capacitive element C1, the current flowing from the first charger 51 to the capacitive element C1 does not flow into the second charger 52.

In the non-lighting mode, the bidirectional switch 2 is in the off state, and a pulsating voltage obtained by full-wave rectification of the AC voltage Vac by the diode bridge is input to the power supply 5. At this time, in the power supply 5, the charging current flows to the capacitive element C1 via the first charger 51, and thus, the charging current is more suppressed than in a case where the current flows to the capacitive element C1 via the second charger 52, which can reduce stress applied to the circuit component. Thus, while the charging current flowing to the capacitive element C1 is reduced, electric power required for operation of the controller 6 and the switch driver 9 is secured in the capacitive element C1.

Next, operation of the power supply 5 in the lighting mode will be described with reference to FIG. 3.

For the on time (the second time period T2) during which the bidirectional switch 2 is in the on state in the lighting mode, a voltage generated between the input terminals 11 and 12 is very small, and the power supply 5 cannot charge the electricity accumulator 50. That is, the power supply 5 can charge the electricity accumulator 50 only in the OFF time (first time period T1, third time period T3, and fourth time period T4) of the bidirectional switch 2, and the power supply 5 of the present embodiment charges the electricity accumulator 50 during the third time period T3 and the fourth time period T4.

Moreover, in the lighting mode, when the dimming level increases and approaches the upper limit value of the dimming level, the second time period T2 increases, which reduces a time (a total time of the third time period T3 and the fourth time period T4) in which the electricity accumulator 50 can be charged. Moreover, the voltage value of the AC voltage Vac applied to the input terminals 11 and 12 during the third time period T3 and the fourth time period T4 also decreases. Thus, the power supply 5 has to charge the electricity accumulator 50 in a short period of time even when the AC voltage Vac is low.

Thus, in the lighting mode, the switching controller 61 sets the switching signal Sa1 to the ON signal at the second time point t2 and retains the ON signal from the second time point t2 to the end time point t4 of the half period for each half period of the AC voltage Vac. When the switching signal Sa1 becomes the ON signal, the switching device Q5 is turned on and the switching device Q4 is turned on, thereby achieving a state where the charging current flows to the capacitive element C1 via the second charger 52. Moreover, the controller 6 controls the stop signal Ss1 which is to be output to the stopper 13 such that the stop signal Ss1 is the ON signal at the switching time point (the second time point t2) which is a starting point of the OFF time to electrically connect the power supply 5 to the input terminals 11 and 12. Note that the switching controller 61 may switch the switching signal Sa1 from the OFF signal to the ON signal at any time between the first time point t1 and the second time point t2.

Thus, during the OFF time (a total time period of the third time period T3 and the fourth time period T4) from the second time point t2 to the end time point t4 of the half period, the second charger 52 receives electric power supplied from the AC power supply 8 to cause the charging current to flow to the electricity accumulator 50 so as to generate control electric power. Thus, the capacitive element C1 is started to be charged from the second time point t2, and the voltage Vc1 of the capacitive element C1 gradually increases. In the second charger 52, the impedance seen from the input terminals 11 and 12 is lower than that in the first charger 51. Thus, the charging current flowing to the capacitive element C1 increases, and the second charger 52 charges the capacitive element C1 in a shorter time. That is, the impedance of the charger (second charger 52) for causing a current to flow to the electricity accumulator 50 in the lighting mode is lower than the impedance of the charger (first charger 51) for causing a current to the electricity accumulator 50 in the non-lighting mode.

Moreover, in the OFF time (during a time period for charging the electricity accumulator 50), the controller 6 compares the voltage Vc1 of the capacitive element C1 with the threshold Vth1. When the voltage Vc1 reaches the threshold Vth1, the controller 6 switches the stop signal Ss1 from the ON signal to the OFF signal. After switching the stop signal Ss1 to the OFF signal, the controller 6 retains the stop signal Ss1 as the OFF signal at least until the next first time point (the generation time point of the first detection signal ZC1 or the second detection signal ZC2) t1.

While the stop signal Ss1 is the OFF signal, the stopper 13 electrically disconnects the power supply 5 from the input terminals 11 and 12 so as to halt the charging of the electricity accumulator 50. Thus, even in the OFF time, the second charger 52 does not always cause the charging current to flow to the capacitive element C1. After the capacitive element C1 is charged until the voltage Vc1 of the capacitive element C1 reaches the threshold Vth1, charging the capacitive element C1 is stopped. When the charging the capacitive element C1 is stopped, electric charges accumulated in the capacitive element C1 is consumed by the controller 6, which gradually reduces the voltage Vc1 of the capacitive element C1.

In the present embodiment, if the stop signal Ss1 is the OFF signal at the first time point (the generation time point of the first detection signal ZC1 or the second detection signal ZC2) t1, the controller 6 switches the stop signal Ss1 to the ON signal. If the stop signal Ss1 is the ON signal at the first time point t1, the controller 6 retains the stop signal Ss1 as the ON signal. Thus, when the stopper 13 halts the charging of the electricity accumulator 50 during the off-time period, the electricity accumulator 50 is restarted to be charged immediately after the phase (zero crossing point) of the AC voltage Vac is detected by the phase detector 3. Note that, during the second time period T2 from the first time point t1 to the second time point (switching time point) t2, the bidirectional switch 2 is in the on state (bidirectionally on state), and basically, supplying electric power from the AC power supply 8 to the power supply 5 cannot be secured. Thus, the power supply 5 does not generate control electric power. During the time period from the starting point t0 to the first time point t1 of the half period of the AC voltage Vac, the bidirectional switch 2 is in the off state. Thus, during this time period, the second charger 52 may perform charging operation for causing the charging current to flow to the electricity accumulator 50.

(1.4) Advantages

In the light-dimming device 1 of the present embodiment, the switching controller 61 performs a switching operation to select the second charger 52 as a charger for causing a charging current to flow to the electricity accumulator 50 in the lighting mode. That is, the impedance of the charger (including the first charger 51 and the second charger 52) for causing a current to flow to the electricity accumulator 50 in the lighting mode is lower than the impedance of the charger for causing a current to flow to the electricity accumulator 50 in the non-lighting mode. Thus, even when the dimming level increases and the charging time period during which the current flows to the electricity accumulator 50 decreases, increasing the charging current flowing from the second charger 52 to the electricity accumulator 50 enables the electricity accumulator 50 to be charged in a short period of time. The proportion of the on time to the half period of the AC voltage Vac increases depending on types of the load, and accordingly, the charging time period during which the current flows to the electricity accumulator 50 may decrease. However, the light-dimming device 1 of the present embodiment enables the second charger 52 to rapidly charge the electricity accumulator 50. This enables the electricity accumulator 50 to accumulate electric power required to operate the controller 6 and the like, and therefore, the light-dimming device 1 becomes compatible with an increased number of types of loads. A voltage applied between the pair of input terminals 11 and 12 in the non-lighting mode is higher than that in the lighting mode. However, the impedance of the charger for causing the current to flow to the electricity accumulator 50 in the non-lighting mode is higher than that in the lighting mode. Thus, the charging current flowing to the electricity accumulator 50 is reduced. This reduces stress applied to the circuit component of the charger.

As in the present embodiment, the second charger 52 may include a switching device Q4 configured to switch between non-conduction and conduction of a current flowing from the pair of input terminals 11 and 12 to the electricity accumulator 50 in accordance with the switching signal Sa1 input from the switching controller 61. Turning on the switching device Q4 enables the impedance seen from the input terminals 11 and 12 to be reduced to less than the impedance in the first charger 51 and enables a current larger than the current in the first charger 51 to flow to the electricity accumulator 50. Thus, it is possible to charge the electricity accumulator 50 in a short period of time.

As in the present embodiment, the light-dimming device 1 may further include the phase detector 3 configured to detect the phase of the AC voltage Vac. The controller 6 may retain the bidirectional switch 2 in the on state based on the detection signal from the phase detector 3 in the lighting mode until a variable time including the on time elapses from the starting point of the half period of the AC voltage Vac.

Moreover, examples of a control method of the light-dimming device include a normal phase control method (leading edge method) in addition to a reverse phase control method (trailing edge method). The normal phase control method establishes conduction between the pair of input terminals 11 and 12 during a time period from a time point during the half period of the AC voltage Vac to the zero crossing point. In the reverse phase control method, the load 7 including an LED element serving as a light source is started to be supplied with electric power from the zero crossing point, and therefore, it is possible to reduce a current waveform deformation at the start of the electric power supply. Thus, the number of loads 7 (lamps) connectable to the light-dimming device increases, and the generation of a howling sound can be reduced.

While the light-dimming device 1 of the present embodiment basically adopts the reverse phase control method, the load 7 is started to be supplied with electric power at the first time point (the generation time point of the first detection signal ZC1 or the second detection signal ZC2) t1 slightly later than the starting point (zero crossing point) t0 of the half period. Thus, the current waveform deformation may be larger than that in the reverse phase control method in which the load 7 is started to be supplied with electric power at the zero crossing point. However, the absolute value of the AC voltage Vac at the first time point t1 is not very large, and therefore, the influence of the current waveform deformation is negligibly small.

Moreover, as in the present embodiment, the light-dimming device 1 may further include the voltage detector 62 configured to detect the voltage Vc1 of the electricity accumulator 50 and the stopper 13 configured to halt the charging of the electricity accumulator 50 when the stopper 13 receives the stop signal from the controller 6. The controller 6 may be configured to output the stop signal to the stopper 13 when the voltage Vc1 detected by the voltage detector 62 reaches the prescribed threshold Vth1 in a state where the charger (second charger 52) causes a current to flow to the electricity accumulator 50 in the lighting mode.

When the voltage Vc1 of the electricity accumulator 50 reaches the threshold Vth1, the charger (second charger 52) stops charging operation. Thus, a difference between the voltage applied between the input terminals 11 and 12 and the AC voltage Vac is smaller as compared to the case where the stopper 13 is not provided. Thus, the phase detector 3 enables more accurate detection of the phase of the AC voltage Vac, thereby improving controllability of the phase control.

(1.5) Variation (1.5.1) First Variation

Figure 4:
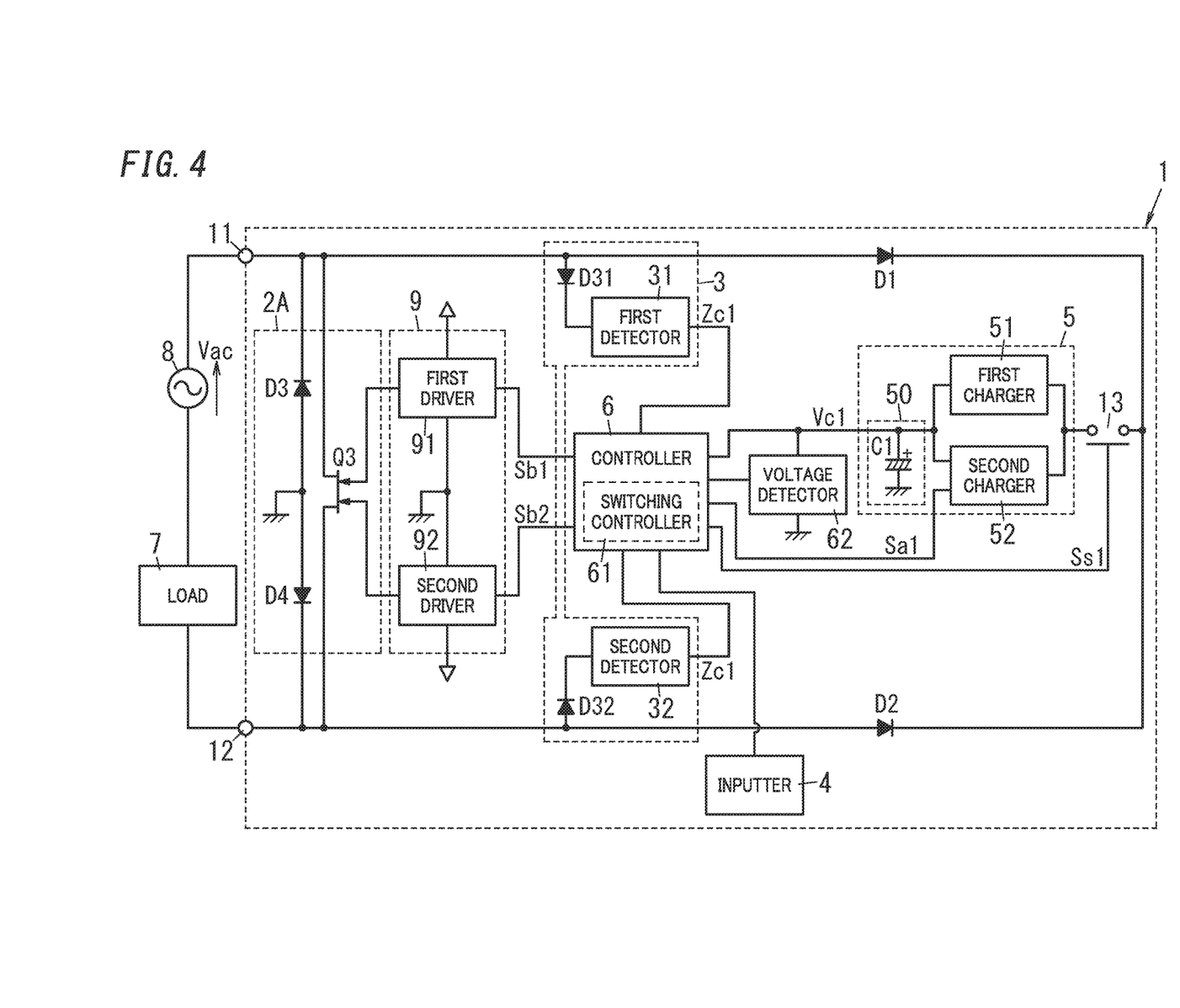
FIG. 4 is a circuit diagram schematically illustrating a configuration of a light-dimming device according to a variation of the embodiment.

As illustrated in FIG. 4, a bidirectional switch 2A of a light-dimming device 1A according to a first variation of the above-described embodiment is different from the bidirectional switch 2 of the light-dimming device 1 of the above-described embodiment. Components similar to those in the above-described embodiment are hereinafter denoted by the same reference signs as those in the above-described embodiment, and the description thereof will be omitted accordingly.

In the present variation, the bidirectional switch 2A includes a switching device Q6 having a double gate structure. The switching device Q6 is a semiconductor element having a double gate (dual gate) structure including a semiconductor material of a wide band gap such as gallium nitride (GaN). Moreover, the bidirectional switch 2A includes a pair of diodes D3 and D4 connected to each other in a so-called anti-series connection between input terminals 11 and 12. The cathode of the diode D3 is connected to the input terminal 11, and the cathode of the diode D4 is connected to the input terminal 12. The anodes of both the diodes D3 and D4 are electrically connected to ground of a power supply 5. In the present variation, the pair of diodes D3 and D4 and a pair of diodes D1 and D2 together form a diode bridge.

According to the configuration of the present variation, the bidirectional switch 2A can reduce the conduction loss more than the bidirectional switch 2.

(1.5.2) Other Variations

Variations of the embodiment other than the above-described first variation will be mentioned below.

The light-dimming device of each of the above-described embodiment and the first variation is applicable not only to the load 7 using an LED device as a light source but also to a light source including a capacitor input-type circuit, having a high impedance, and being lit with a small current. Examples of such a light source include an organic electroluminescence (EL) element. Moreover, the light-dimming device is applicable to loads 7 of various light sources such as a discharge lamp.

Moreover, a control method of the bidirectional switch 2 by the controller 6 is not limited to the above-described examples, and may be, for example, a method for alternately setting the first control signal and the second control signal to the ON signal at the same cycle as the AC voltage Vac. In this case, the bidirectional switch 2 is conductive during a time period during which one of the switching devices Q1 and Q2 corresponding to a high-potential side of the AC voltage Vac is on. That is, this variation realizes so-called reverse phase control for establishing conduction between the pair of input terminals 11 and 12 during a time period from the zero crossing point of the AC voltage Vac to a time point during the half period. In this case, a phase difference between the first control signal and the AC voltage Vac and a phase difference between the second control signal and the AC voltage Vac are controlled to adjust conduction time of the bidirectional switch 2.

Moreover, the control method of the bidirectional switch 2 is not limited to the reverse phase control method (trailing edge method) but may be a normal phase control method (leading edge method).

When the control method of the bidirectional switch 2 is a normal phase control method, the controller 6 turns on the bidirectional switch 2 at a time point when the OFF time having a length according to the dimming signal elapses from the starting point (zero crossing point) of the half period during the half period of the AC voltage Vac. Moreover, the controller 6 turns off the bidirectional switch 2 at a time point when a time obtained by subtracting a definite time period from the time of the half period elapses from the starting point of the half period. That is, in the normal phase control method, the bidirectional switch 2 is in the on state from a time point when the OFF time corresponding to the dimming signal elapses from the starting point of the half period of the AC voltage Vac until immediately before the end time point (zero crossing point) of the half period. In other words, the bidirectional switch 2 is in the off state during a time period from a point immediately before the zero crossing point of the AC voltage Vac to a time point when a time obtained by adding a definite time period to the OFF time having a length according to the dimming signal elapses.

Also in this case, the switching controller 61 of the controller 6 selects, as a charger which causes the charging current to flow to the electricity accumulator 50, the first charger 51 in the non-lighting mode and the second charger 52 in the lighting mode in addition to the first charger 51. Thus, in the lighting mode, when a current is caused to flow to the electricity accumulator 50 during a time period during which the bidirectional switch 2 is in the off state, the current flows to the electricity accumulator 50 via the second charger 52 having a low impedance. The controller 6 causes the stopper 13 to halt the charging of the electricity accumulator 50 when the voltage Vc1 detected by the voltage detector 62 reaches the prescribed threshold Vth1 in a state where a current flows to the electricity accumulator 50 via the second charger 52. Note that in the non-lighting mode, a current flows to the electricity accumulator 50 via the first charger 51, thereby charging the electricity accumulator 50.

Moreover, the switch driver 9 is not an essential configuration of the light-dimming device 1 and may thus accordingly be omitted. When the switch driver 9 is omitted, the controller 6 directly drives the bidirectional switch 2.

Moreover, each of the switching devices Q1 and Q2 included in the bidirectional switch 2 is not limited to an enhancement n-channel MOSFET but may be, for example, an insulated gate bipolar transistor (IGBT). Moreover, in the bidirectional switch 2, the rectifier element (diode) for realizing the unidirectionally on state is not limited to the parasitic diodes of the switching devices Q1 and Q2 but may be an external diode such as those described in the first variation. The diode may be accommodated in an identical package with each of the switching devices Q1 and Q2. Moreover, the diodes D1 and D2 in each of the above-described embodiment and the first variation are not essential configurations of the light-dimming device 1, and thus, the diodes D1 and D2 may be accordingly omitted.

Moreover, the first time period T1 is required only to be a certain length of time period, and the length of the first time can be accordingly set. For example, when the first time period T1 corresponds to a sum of a time period from a starting point (zero crossing point) t0 of the half period to a detection point and a time period from the detection point until a certain delay time elapses, the delay time is not limited to 300 μs but is accordingly set to a value within a range from 0 μs to 500 μs.

Moreover, the third time point t3 is required only to be earlier than the end time point (zero crossing point) t4 of the half period, and the length from the third time point t3 to the end time point t4 of the half period can be accordingly determined. For example, when the time length from the first time point t1 to the third time point t3 is shorter than the half period by a certain specified time, the specified time is not limited to 300 µs but may be accordingly set to a value within a range from 100 µs to 500 µs.

Moreover, the stopper 13 is at least required to be configured to halt the charging of the electricity accumulator 50 when the voltage Vc1 detected by the voltage detector 62 in the lighting mode reaches the threshold Vth1, and it is not an essential configuration that the stopper 13 is controlled by the stop signal Ss1 from the controller 6. For example, the stopper 13 may have a function of comparing the detection value of the voltage detector 62 with the threshold Vth1, and based on the comparison result, the stopper 13 may halt the charging of the electricity accumulator 50. Moreover, the voltage detector 62 may be disposed in the controller 6. In this case, for example, when the capacitive element C1 is connected to an A/D conversion input terminal of the controller 6, the voltage Vc1 of the capacitive element C1 is input to the controller 6 as an analog value.

Moreover, the configuration of the stopper 13 is not limited to a configuration for electrically disconnecting a connection of at least one of the pair of input terminals 11 and 12 to the power supply 5. For example, the stopper 13 may be configured to stop an output (an output of control electric power) of the power supply 5 to increase the input impedance of the power supply 5 or to control the semiconductor switching device included in the power supply 5 to halt the charging of the electricity accumulator 50.

Other Embodiments

In the above-described embodiment (including the variations), supplying electric power from the AC power supply 8 to the power supply 5 is secured during the third time period T3 from the above-described second time point t2 to the third time point t3, but the above-described embodiments are not limited to this configuration.

Supplying electric power from the AC power supply 8 to the power supply 5 may be secured over the time period (third time period T3, fourth time period T4) from the above-described second time point t2 to the end time point t4 (zero crossing point) of the half period of the AC voltage Vac. Only during a period (the first time period T1) after the starting point (zero crossing point) t0 of the half period of the AC voltage Vac, supplying electric power from the AC power supply 8 to the power supply 5 may be secured for a definite time. Supplying electric power from the AC power supply 8 to the power supply 5 may be secured before and after (third time period T3, fourth time period T4, first time period T1) the starting point (zero crossing point) t0 of the half period of the AC voltage Vac. That is, supplying electric power from the AC power supply 8 to the power supply 5 can be secured in any of the first time period T1, the third time period T3, and the fourth time period T4. Note that when a user manipulates the manipulation section so as to maximize the light output of the load 7, priority is given to securing the first time period T1, the third period T3, and the fourth time period T4, and the second time period T2 may be controlled to be a time period shorter than a length at which the light output is maximized.

During the off-time period of the bidirectional switch 2, supplying electric power from the AC power supply 8 to the power supply 5 enables the controller 6 to stably operate.

REFERENCE SIGNS LIST 1, 1A Light-Dimming Device
2, 2A Bidirectional Switch
3 Phase Detector
4 Inputter
6 Controller
7 Illumination Load
8 AC Power Supply
11, 12 Input Terminal
13 Stopper
50 Electricity Accumulator
51 First Charger (Charger)
52 Second Charger (Charger)
61 Switching Controller
Q4 Switching Device
Sa1 Switching Signal
Vc1 Voltage of Electricity Accumulator
Vth1 Threshold

The invention claimed is:

1. A light-dimming device, comprising:
a pair of input terminals electrically connected between an illumination load and an AC power supply;
a bidirectional switch configured to switch between non-conduction and conduction of a bidirectional current between the pair of input terminals;
an inputter configured to receive a signal denoting a dimming level specifying a magnitude of a light output of the illumination load;
an electricity accumulator configured to accumulate an electric charge to generate control electric power;
a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on; and
a charger configured to cause a current to flow therethrough from the pair of input terminals to the electricity accumulator, wherein
an impedance through which current flows to the electricity accumulator in a lighting mode is lower than an impedance through which current flows to the electricity accumulator in a non-lighting mode,
the charger includes a first charger and a second charger each configured to cause a charging current to flow to the electricity accumulator,
the second charger has an impedance lower than an impedance of the first charger,
the second charger includes a switching device connected between the pair of input terminals and the electricity accumulator, and
the light-dimming device further includes a switching controller configured to retain the switching device in an off state in the non-lighting mode and to retain the switching device in an on state in the case of causing the current to flow to the electricity accumulator in the lighting mode.

2. The light-dimming device according to claim 1, further comprising a phase detector configured to detect a phase of the AC voltage, wherein
the controller is configured to retain the bidirectional switch in an on state based on a detection signal from the phase detector in the lighting mode until a variable time including the on time elapses from a starting point of the half period of the AC voltage.

3. The light-dimming device according to claim 1, further comprising:
a voltage detector configured to detect a voltage of the electricity accumulator; and a stopper configured to halt charging of the electricity accumulator when the stopper receives a stop signal from the controller, wherein the controller is configured to output the stop signal to the stopper when the voltage detected by the voltage detector reaches a prescribed threshold in a state where the charger causes a current to flow to the electricity accumulator in the lighting mode.

4. The light-dimming device according to claim 2, further comprising:

a voltage detector configured to detect a voltage of the electricity accumulator; and a stopper configured to halt charging of the electricity accumulator when the stopper receives a stop signal from the controller, wherein the controller is configured to output the stop signal to the stopper when the voltage detected by the voltage detector reaches a prescribed threshold in a state where the charger causes a current to flow to the electricity accumulator in the lighting mode.

5. A light-dimming device comprising:

a pair of input terminals electrically connected between an illumination load and an AC power supply;

a bidirectional switch configured to switch between non-conduction and conduction of a bidirectional current between the pair of input terminals;

an inputter configured to receive a signal denoting a dimming level specifying a magnitude of a light output of the illumination load;

an electricity accumulator configured to accumulate an electric charge to generate control electric power;

a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on;

a charger configured to cause a current to flow therethrough from the pair of input terminals to the electricity accumulator; and a phase detector configured to detect a phase of the AC voltage, wherein an impedance through which current flows to the electricity accumulator in a lighting mode is lower than an impedance through which current flows to the electricity accumulator in a non-lighting mode, and the controller is configured to retain the bidirectional switch in an on state based on a detection signal from the phase detector in the lighting mode until a variable time including the on time elapses from a starting point of the half period of the AC voltage.

6. The light-dimming device according to claim 5, further comprising:

a voltage detector configured to detect a voltage of the electricity accumulator; and a stopper configured to halt charging of the electricity accumulator when the stopper receives a stop signal from the controller, wherein the controller is configured to output the stop signal to the stopper when the voltage detected by the voltage detector reaches a prescribed threshold in a state where the charger causes a current to flow to the electricity accumulator in the lighting mode.

7. A light-dimming device comprising:

a pair of input terminals electrically connected between an illumination load and an AC power supply;

a bidirectional switch configured to switch between non-conduction and conduction of a bidirectional current between the pair of input terminals;

an inputter configured to receive a signal denoting a dimming level specifying a magnitude of a light output of the illumination load;

an electricity accumulator configured to accumulate an electric charge to generate control electric power;

a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on;

a charger configured to cause a current to flow therethrough from the pair of input terminals to the electricity accumulator;

a voltage detector configured to detect a voltage of the electricity accumulator; and a stopper configured to halt charging of the electricity accumulator when the stopper receives a stop signal from the controller, wherein an impedance through which current flows to the electricity accumulator in a lighting mode is lower than an impedance through which current flows to the electricity accumulator in a non-lighting mode, and the controller is configured to output the stop signal to the stopper when the voltage detected by the voltage detector reaches a prescribed threshold in a state where the charger causes a current to flow to the electricity accumulator in the lighting mode.

8. A light-dimming device comprising:

a pair of input terminals electrically connected between an illumination load and an AC power supply;

a bidirectional switch configured to switch between non-conduction and conduction of a bidirectional current between the pair of input terminals;

an inputter configured to receive a signal denoting a dimming level specifying a magnitude of a light output of the illumination load;

an electricity accumulator configured to accumulate an electric charge to generate control electric power;

a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on; and a charger configured to cause a current to flow therethrough from the pair of input terminals to the electricity accumulator, wherein an impedance through which current flows to the electricity accumulator in a lighting mode is lower than an impedance through which current flows to the electricity accumulator in a non-lighting mode, the charger includes a first charger and a second charger each configured to cause a charging current to flow to the electricity accumulator, and the second charger has an impedance lower than an impedance of the first charger.

9. A light-dimming device, comprising:

a pair of input terminals electrically connected between an illumination load and an AC power supply;

a bidirectional switch configured to switch between non-conduction and conduction of a bidirectional current between the pair of input terminals;

an inputter configured to receive a signal denoting a dimming level specifying a magnitude of a light output of the illumination load;

an electricity accumulator configured to accumulate an electric charge to generate control electric power;

a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on; and a charger configured to cause a current to flow therethrough from the pair of input terminals to the electricity accumulator, wherein an impedance of the charger in a case of causing a current to flow to the electricity accumulator in a lighting mode is lower than an impedance of the charger in a case of causing a current to flow to the electricity accumulator in a non-lighting mode, wherein the charger includes a first charger and a second charger each configured to cause a charging current to flow to the electricity accumulator, and the second charger has an impedance lower than an impedance of the first charger.

10. A light-dimming device, comprising:

a pair of input terminals electrically connected between an illumination load and an AC power supply;

a bidirectional switch configured to switch between non-conduction and conduction of a bidirectional current between the pair of input terminals;

an inputter configured to receive a signal denoting a dimming level specifying a magnitude of a light output of the illumination load;

an electricity accumulator configured to accumulate an electric charge to generate control electric power;

a controller configured to be supplied with the control electric power from the electricity accumulator to operate and to retain the bidirectional switch in an on state for an on time having a length according to the dimming level in every half period of an AC voltage of the AC power supply in a lighting mode in which the illumination load is on; and a charger configured to cause a current to flow therethrough from the pair of input terminals to the electricity accumulator, wherein the charger includes a first charger and a second charger each configured to cause a charging current to flow to the electricity accumulator, and the second charger has an impedance lower than an impedance of the first charger.

* * * * *